*J. Absterdam,*
*Journal-Bearing Box.*
Nº 35,132. Patented May 6, 1862.
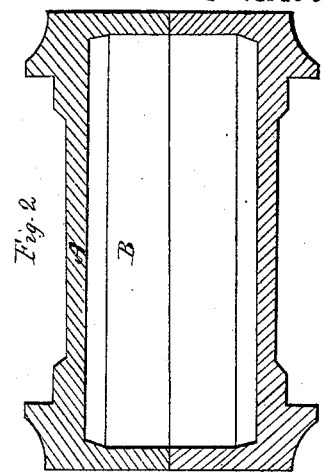
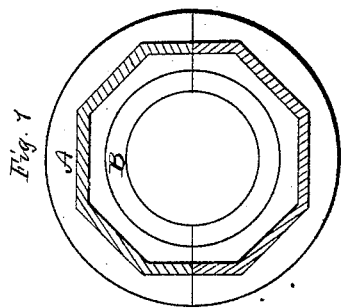
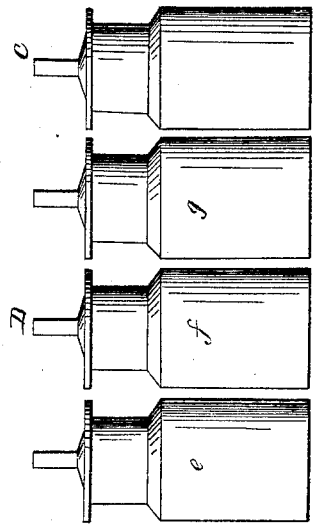
Witnesses: Daniel Sloan
Inventor: John Absterdam

UNITED STATES PATENT OFFICE.

JOHN ABSTERDAM, OF NEW YORK, N. Y.

IMPROVED COMPOSITION FOR FORMING JOURNAL-BOXES, BEARINGS, &c.

Specification forming part of Letters Patent No. 35,132, dated May 6, 1862.

*To all whom it may concern:*

Be it known that I, JOHN ABSTERDAM, scientific and mechanical engineer, of the city, county, and State of New York, have invented a new and useful Composition for Filling and Forming Boxes for Bearings of Journals of Shafts and Axles; and I do hereby declare that the following is a full and exact description thereof, reference being had to the accompanying drawings, and to the letters of reference marked thereon, in which—

Figure 1 is a transverse sectional view. Fig. 2 is a longitudinal section of the same.

A represents a hollow metallic journal-box lined with my composition.

B represents my composition inserted into the metallic box formed into a bearing of a journal of a shaft.

C represents a glass flagon containing fragments of my composition.

D represents three glass flagons containing the ingredients composing my composition. *e* contains sulphur. *f* contains black-lead.

The nature of my invention consists in filling and forming boxes for bearings of journals of shafts and axles with a mineral composition made of sulphur, black-lead, steatite, and metallic oxides or sulphurets, or made only with sulphur and black-lead, and capable of being melted and remelted into a liquid state, so as to be used as a substitute for Babbitt metal, which composition, being of a lubricating nature, prevents the journals from heating by friction and saves a large amount of lubricating-oil.

To enable others skilled in the art to make and use my invention, I will proceed to describe its construction and operation.

I take any desired quantity of sulphur and submit it to the action of heat in an iron ladle or any other suitable vessel. As soon as the sulphur is melted I add to it any desired quantity of ground or pulverized black-lead and a small quantity of steatite; also, a few drops of oil. A very good proportion of the materials is ten parts, by weight, of sulphur and five parts or less of black-lead, or ten parts of sulphur, three parts of black-lead, one part of steatite, and one part of metallic oxides, and stir the whole together. When the mixture has assumed the consistency of a thick paste, I knead it well for several hours, increasing the heat gradually until the whole is completely amalgamated. I then take the ladle or pot from the fire and let it rest. By decreasing the heat the composition becomes liquid, which, if to be used immediately, I pour into the hollow boxes used for bearings of journals of shafts and axles, forming the inner circumference to fit the journal with a mandrel. If not required for immediate use, I run it into ingots ready to be remelted when required for use. In melting the sulphur I add to it a few drops of oil in order to make it less soluble.

In order to harden the composition, I add to it while in a state of fusion metallic filings or oxides, dry paints, and steatite.

The operation of my invention is as follows, viz: My composition diminishes friction without using lubricating-oil, on account of black-lead being of a lubricating nature, and, owing to the fluidity of sulphur and its affinity to amalgamate with metals, I employ so large a quantity of black-lead as to produce a composition highly lubricating. Sulphur, being a bad conductor of heat and possessing refrigerating properties, prevents the journals from heating. Besides the advantage of being self-lubricating and saving a large amount of lubricating-oils, my composition is cheaper than bronze or Babbitt metal, for which it is an admirable substitute, it being used in the same manner and in the same kind of boxes as the Babbitt metal.

This composition may also be employed advantageously for the manufacturing of patterns of light castings, thus avoiding the necessity of facings. It may also be used for an outside coating or bands for rifled-cannon projectiles.

What I claim as new, and desire to secure by Letters Patent, is—

1. A composition of sulphur and black-lead for filling and forming boxes for bearings of journals of shafts and axles, substantially as described.

2. The employment of sulphur, in combination with mineral substances, to form a material or composition for bearings of journal-boxes for shafts and axles, substantially as described.

I do hereby set my hand and signature this 19th day of February, 1862.

JOHN ABSTERDAM.

In presence of—
DANIEL SLOAN,
EDWIN SANDERSON.